US011133591B2

(12) United States Patent
Yamamoto et al.

(10) Patent No.: US 11,133,591 B2
(45) Date of Patent: Sep. 28, 2021

(54) ANTENNA DEVICE, POSITION INPUT DEVICE INCLUDING ANTENNA DEVICE, AND DISPLAY DEVICE INCLUDING ANTENNA DEVICE

(71) Applicant: SHARP KABUSHIKI KAISHA, Sakai (JP)

(72) Inventors: Takuma Yamamoto, Sakai (JP); Takenori Maruyama, Sakai (JP); Kazutoshi Kida, Sakai (JP); Shinji Yamagishi, Sakai (JP); Jean Mugiraneza, Sakai (JP); Hiroshi Fukushima, Sakai (JP); Yasuhiro Sugita, Sakai (JP); Yukio Mizuno, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 27 days.

(21) Appl. No.: 16/703,083

(22) Filed: Dec. 4, 2019

(65) Prior Publication Data
US 2020/0235477 A1 Jul. 23, 2020

Related U.S. Application Data

(60) Provisional application No. 62/782,879, filed on Dec. 20, 2018.

(51) Int. Cl.
H01Q 9/04 (2006.01)
H01Q 1/38 (2006.01)
H04B 5/00 (2006.01)
G06F 3/046 (2006.01)
H01Q 7/00 (2006.01)
G06F 3/044 (2006.01)

(52) U.S. Cl.
CPC .......... H01Q 9/0414 (2013.01); G06F 3/044 (2013.01); G06F 3/046 (2013.01); H01Q 1/38 (2013.01); H01Q 7/00 (2013.01); H04B 5/0025 (2013.01)

(58) Field of Classification Search
CPC .......... H01Q 9/0414; H01Q 1/38; H01Q 7/00; H01Q 1/22; H04B 5/0025; G06F 3/046; G06F 3/044; G06F 3/0446; G06F 3/0445
See application file for complete search history.

(56) References Cited

U.S. PATENT DOCUMENTS

2018/0314369 A1* 11/2018 Yashiro ................ H01Q 1/243
2020/0019264 A1* 1/2020 Kadota ................ G06F 3/0416

FOREIGN PATENT DOCUMENTS

JP 2017-131129 A 8/2017

* cited by examiner

Primary Examiner — Seung H Lee
(74) Attorney, Agent, or Firm — ScienBiziP, P.C.

(57) ABSTRACT

An antenna device includes antenna portions arranged side by side in columns with a partial overlap between the antenna portions next to each other, and common lines each connected to and shared by a set of the antenna portions not overlapping each other to collectively activate the set of the antenna portions.

11 Claims, 14 Drawing Sheets

ANTENNA DEVICE, POSITION INPUT DEVICE INCLUDING ANTENNA DEVICE, AND DISPLAY DEVICE INCLUDING ANTENNA DEVICE

CROSS REFERENCE TO RELATED APPLICATION

This application claims priority from U.S. Provisional Patent Application No. 62/782,879 filed on Dec. 20, 2018. The entire contents of the priority application are incorporated herein by reference.

TECHNICAL FIELD

The present technology described herein relates to an antenna device, a position input device including an antenna device, and a display device including an antenna device.

BACKGROUND ART

An example of a known antenna device is described in International Publication No. 2017-131129. The antenna device includes an antenna layer that includes parallel antenna patterns. The antenna patterns overlap with one another over at least a portion when the antenna layer is viewed in plan view.

In the antenna device, a touch surface does not have an insensitive area during information reading via near field wireless communication. However, the above-described antenna device includes the antenna patterns connected to different wiring lines, and thus has a complex circuit configuration. Furthermore, the time required to activate the antenna patterns is long, because the antenna patterns are activated in sequence.

SUMMARY

The present technology described herein was made in view of the above-described circumstances, and an object thereof is to simplify the circuit configuration and to reduce the activation time.

An antenna device includes antenna portions arranged side by side in columns with a partial overlap between the antenna portions next to each other, and common lines each connected to and shared by a set of the antenna portions not overlapping each other to collectively activate the set of the antenna portions.

The present technology described herein simplifies the circuit configuration and reduces the activation time.

DETAILED DESCRIPTION

First Embodiment

A first embodiment is described with reference to FIGS. 1 to 6. In this embodiment, a liquid crystal display device (display device including an antenna device) 10 having a touch position detection function and a communication function is described as an example. The X axis, the Y axis, and the Z axis are indicated in some of the drawings, and each of the axes indicates the same direction in the respective drawings. Furthermore, the upper side in FIG. 1 is a front side and the lower side in FIG. 1 is a rear side.

Figure 1:
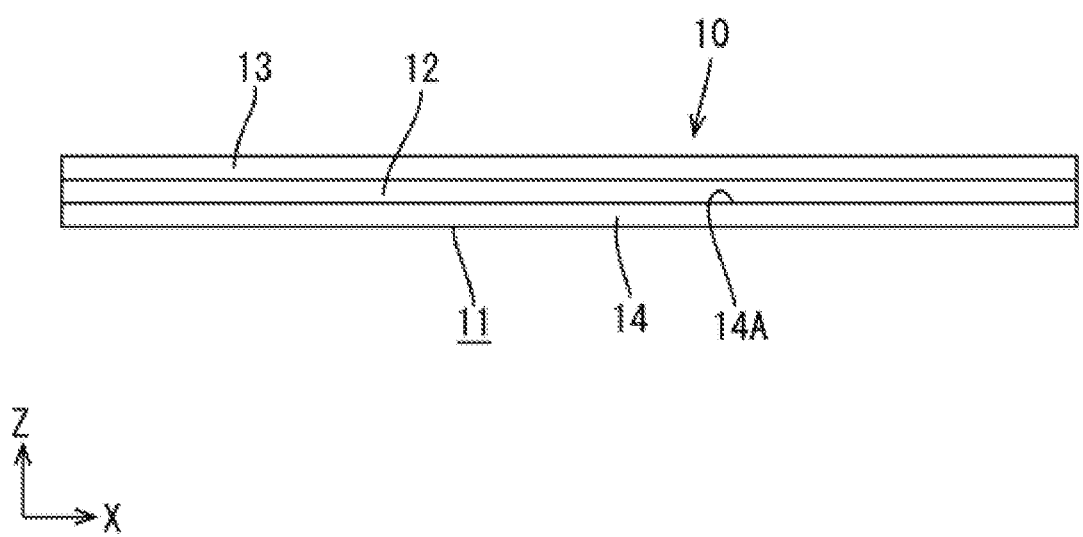
FIG. 1 is a cross-sectional view schematically illustrating a liquid crystal display device according to a first embodiment.

As illustrated in FIG. 1, the liquid crystal display device 10 includes a liquid crystal display module 11 that displays an image, a touch panel (position input device) 12 that detects a position touched by a user (input position), and an antenna device 13 that establishes communication with a communication target. The liquid crystal display module 11, the touch panel 12, and the antenna device 13 are stacked on one another. The touch panel 12 is located between the antenna device 13 located at the frontmost side and the liquid crystal display module 11 located at the rearmost side. The front surface of the liquid crystal display device 10 displays an image seen by the user, receives an input of a touch position by the user, and is a target to which a communication target is moved closer. The liquid crystal display device 10 of the embodiment includes "a touch panel including an antenna device (position input device including an antenna device)" including the touch panel 12 and the antenna device 13 stacked on top of another.

As illustrated in FIG. 1, the liquid crystal display module 11 includes at least a liquid crystal panel (display panel) 14 having a display surface 14A on which an image is displayed and a backlight device that applies display light to the liquid crystal panel 14. The liquid crystal panel 14 includes two substrates and a liquid crystal layer sealed between the substrates. One of the substrates on the front side is a CF substrate (counter substrate) and the other on the rear side is an array substrate (TFT substrate). The CF substrate includes a color filter including coloring portions of R (red), G (green), and B (blue) in a predetermined arrangement, a light-blocking portion (black matrix) separating the adjacent coloring portions, and components, such as an alignment film. The array substrate (TFT substrate) includes switching elements (for example, TFTs) connected to source lines and gate lines disposed perpendicular to each other, pixel electrodes connected to the switching elements, and components, such as an alignment film. The liquid crystal panel 14 has a display area capable of displaying an image in the middle of the display surface 14A.

The touch panel 12 includes a light-transmissive substrate and multiple touch electrodes (position detection electrodes) on the surface of the substrate. The touch electrodes constitute a projected capacitive touch panel pattern. A touch electrode forms capacitance with another touch electrode when an electric current flows through the touch electrodes. The capacitance changes as the user's finger (input body) approaches the touch electrodes. In this configuration, the position input by the finger is detected based on the position of the touch electrode that has a different capacitance from the other touch electrodes while an electric current flows through multiple touch electrodes. The touch panel 12 has the multiple touch electrodes in the middle area of the surface of the substrate, and this area is a touch area where the input position, for example, by a finger is detectable. The touch area substantially matches the display area of the liquid crystal panel 14.

Figure 2:
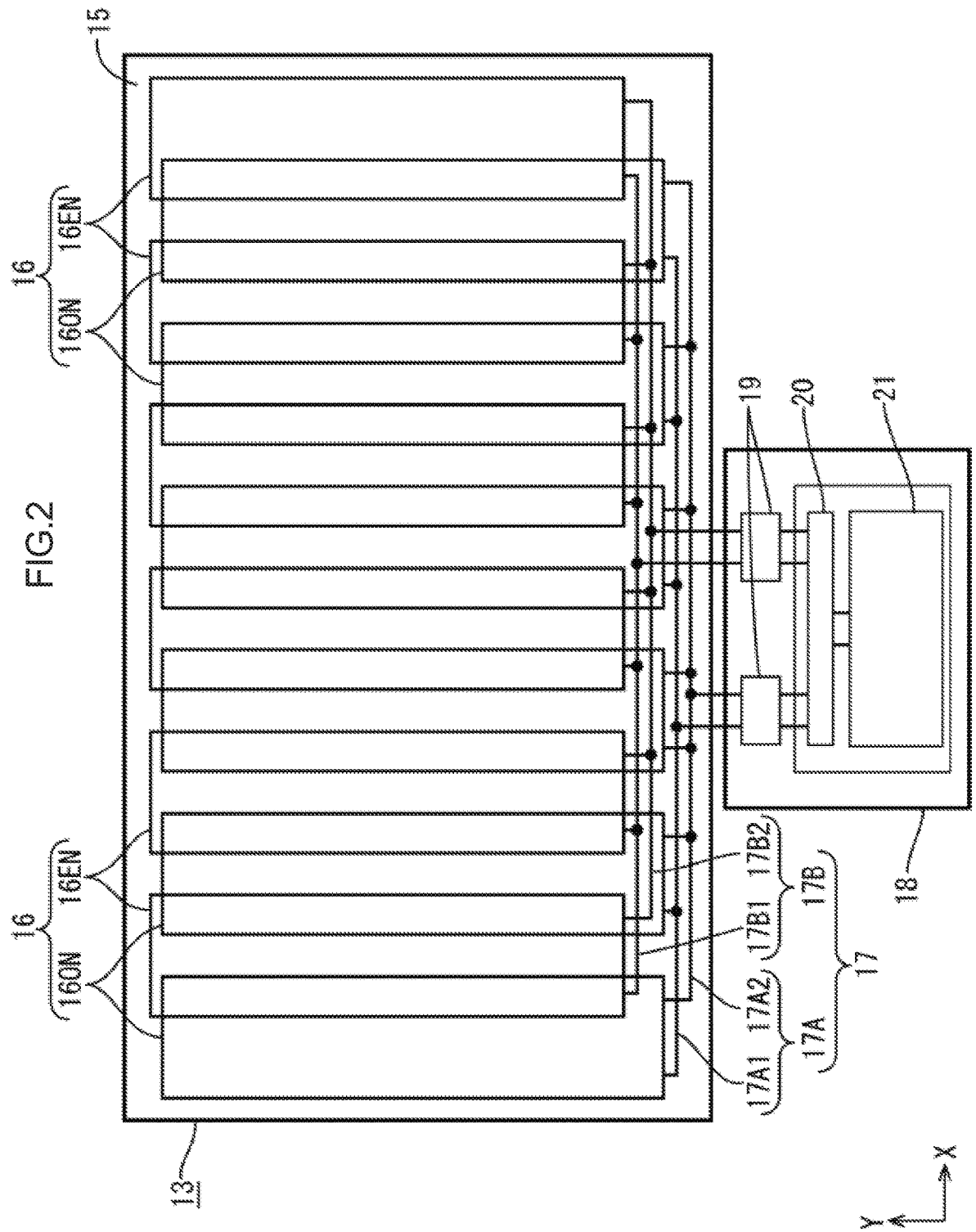
FIG. 2 is a plan view illustrating an antenna device.
Figure 5:
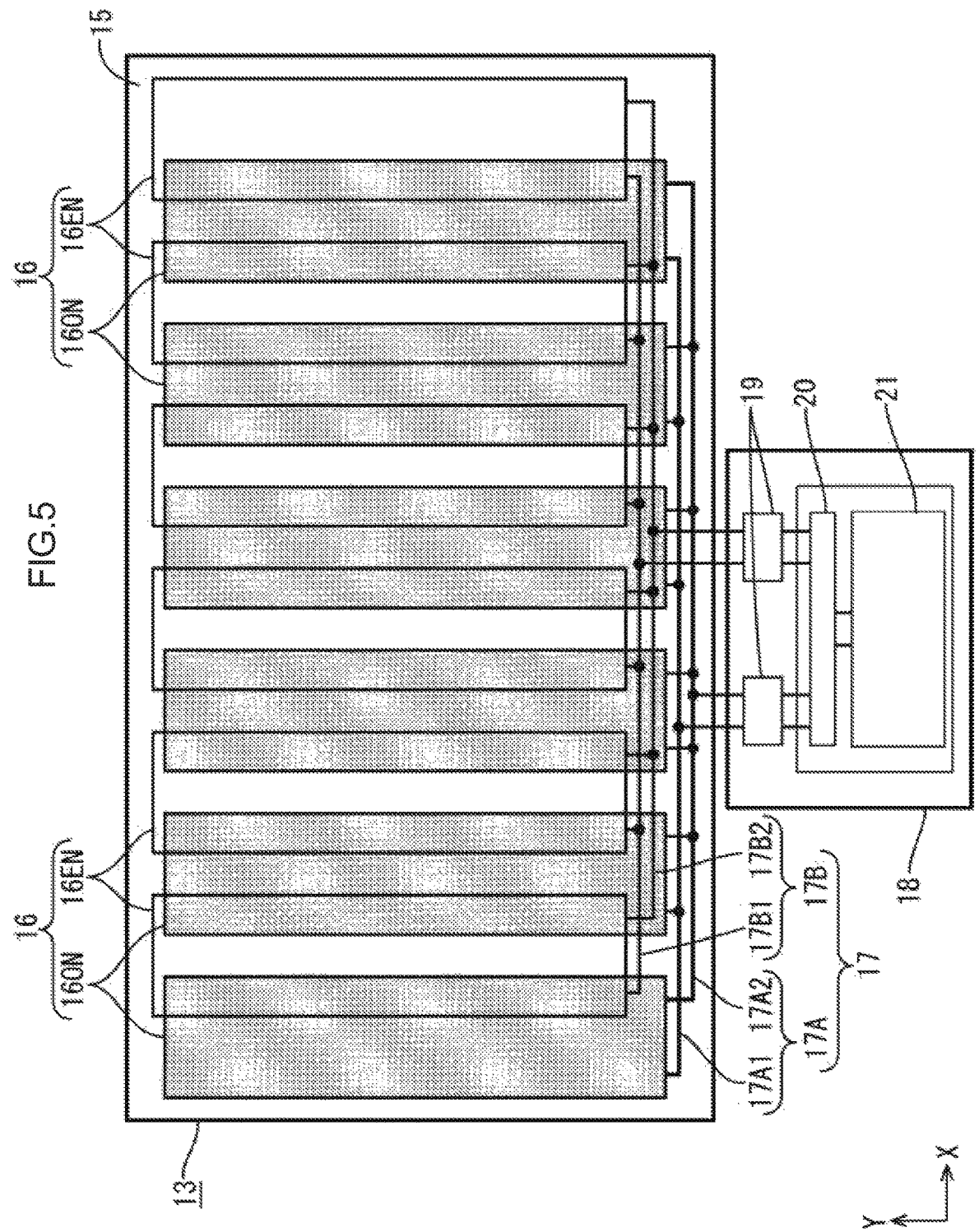
FIG. 5 is a plan view indicating the antenna device in which an electric current flows through odd-number common lines.
Figure 6:
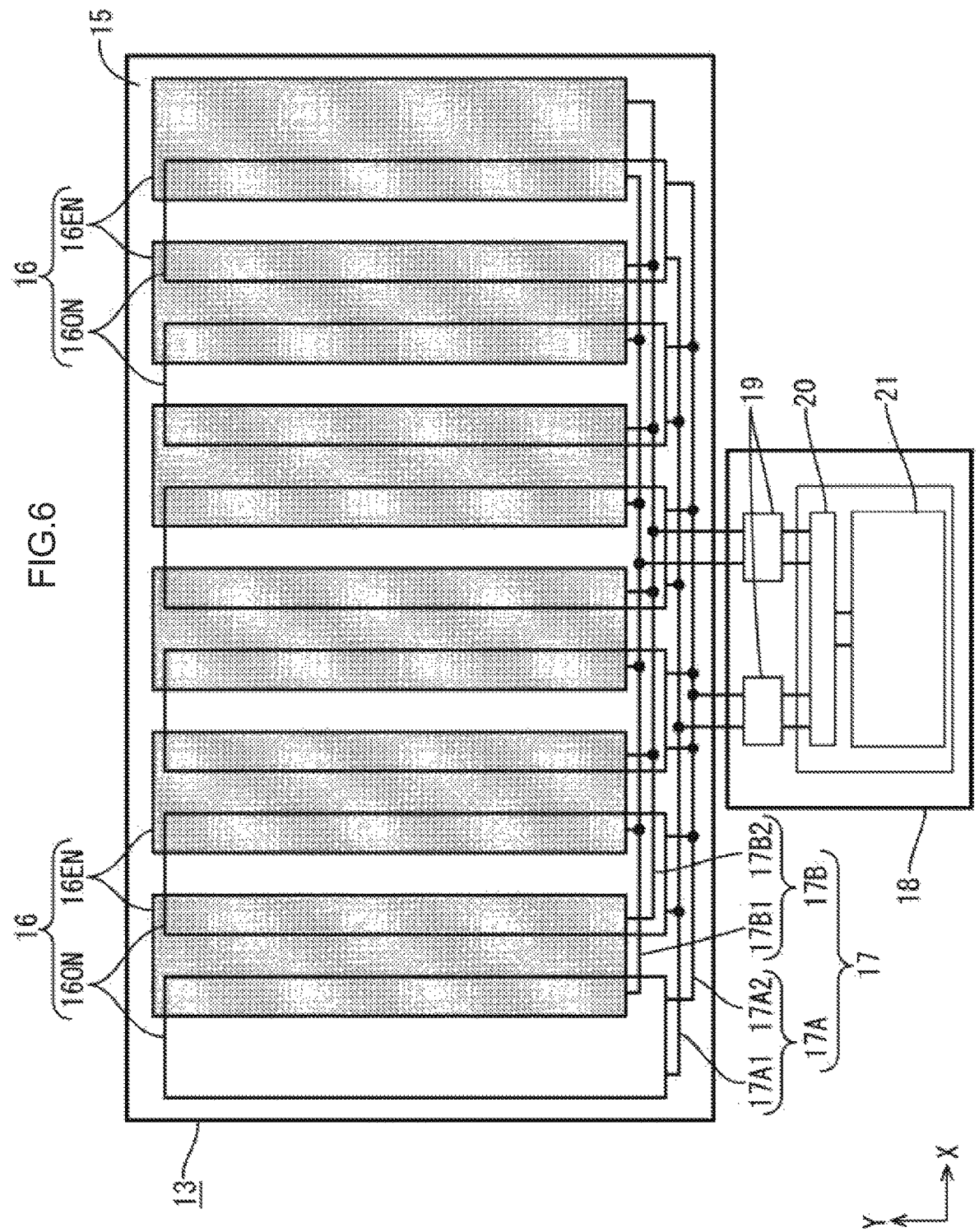
FIG. 6 is a plan view indicating the antenna device in which an electric current flows through even-number common lines.

The antenna device 13 is described in detail. The antenna device 13 uses short-range wireless communication, such as near-field communication (NFC), to establish communication with another device (communication target). Examples of the communication target device include an IC card and a smartphone. The user moves the device closer to the antenna device 13 in accordance with the instructions on the liquid crystal display device 10 to establish short-range wireless communication. The device has a built-in device-side antenna for short-range wireless communication. As illustrated in FIG. 2, the antenna device 13 includes at least a substrate (multi-component substrate) 15 and antenna portions 16 on the substrate 15. The antenna portions 16 establish short-range wireless communication with the device-side antenna. The substrate 15 is formed of a high light-transmissive substantially transparent synthetic resin material or glass material and has a horizontally long rectangular shape in plan view. The antenna portions 16 are disposed on one of the surfaces of the substrate 15 and are arranged side by side in the long-side direction (X-axis direction) of the substrate 15 in columns. The arrangement of the antenna portions 16 will be described in detail later. In FIGS. 2, 5, and 6, the antenna portions 16 are simplified, and only the outlines of the antenna portions 16 are indicated.

Figure 3:
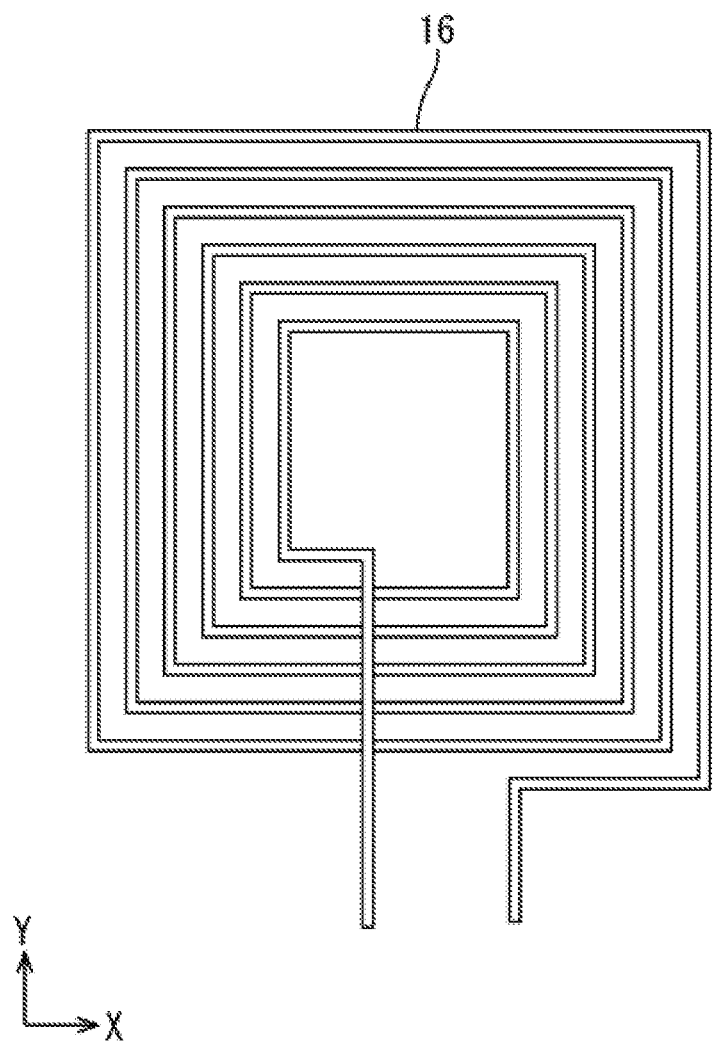
FIG. 3 is a plan view illustrating an antenna portion included in the antenna device.

As illustrated in FIG. 3, the antenna portion 16 has a vertically long rectangular overall shape. The antenna portion 16 extends in a spiral pattern. The antenna portion 16 has multiple layers winding around a center point in a clockwise direction and the layers become longer as the distance from the center increases. Each of the layers of the antenna portion 16 has four sides, and the layer outside the previous one has longer four sides. When an electric current flows through the antenna portion 16, an electrical field is generated around the layers, and a magnetic field is generated in the middle of the antenna portion 16 due to electromagnetic induction. The antenna portion 16 has a vertically long rectangular central area as a magnetic field generation area where a magnetic field is generated. The device-side antenna in the device has substantially the same configuration as the antenna portion 16. Thus, when the device-side antenna is moved toward the antenna portion 16 to an appropriate plane, the magnetic field generated in the magnetic field generation area is captured by the device-side antenna and an induced current flows through the device-side antenna. Contrary to this, when an electric current flows through the device-side antenna positioned close to the antenna portion 16, the induced current flows through the antenna portion 16 due to the magnetic field generated in the device-side antenna. Thus, wireless communication is established between the antenna portion 16 and the device-side antenna.

Figure 4:
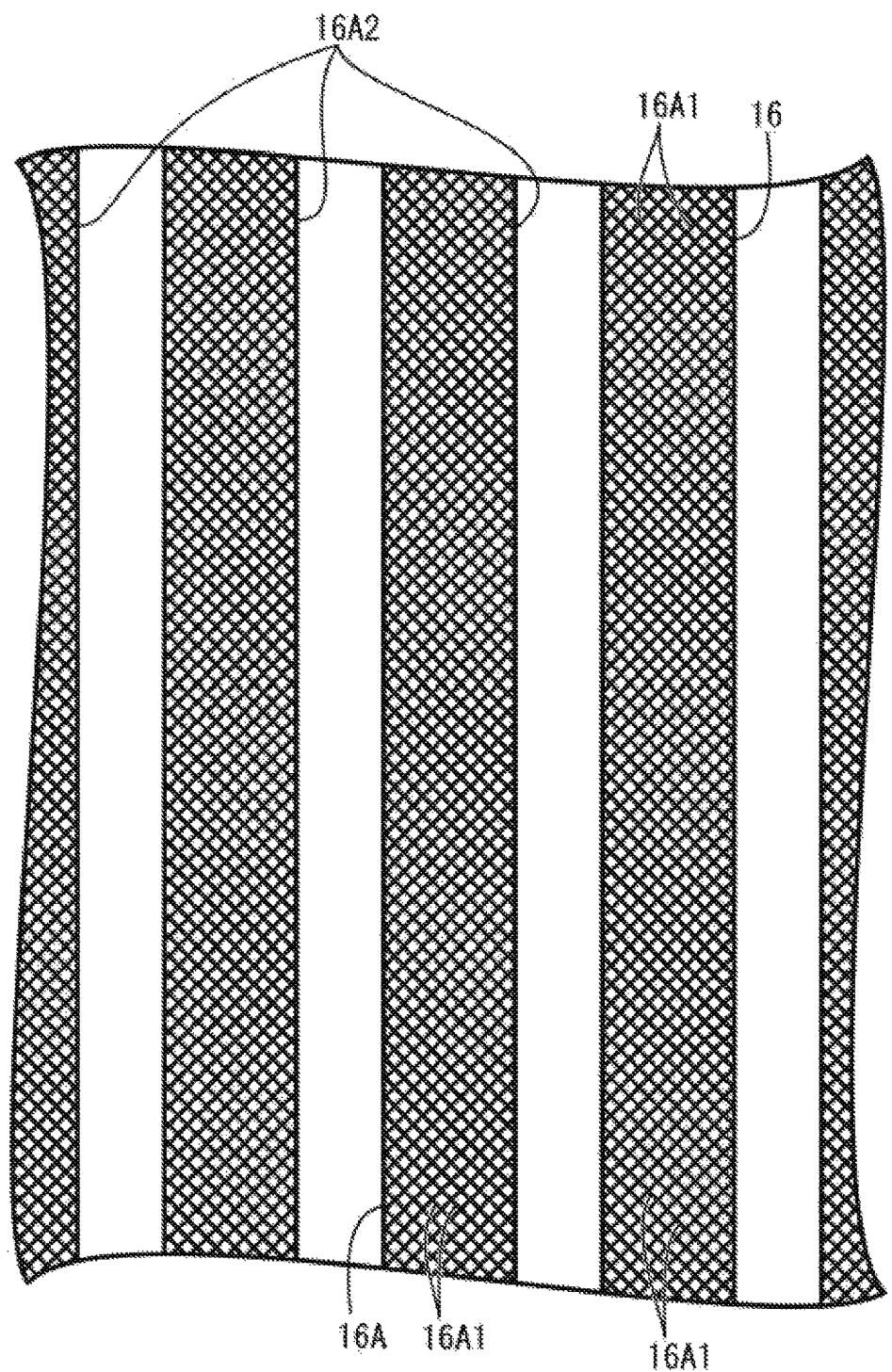
FIG. 4 is a magnified plan view illustrating a portion of the antenna portion.

As illustrated in FIG. 4, the antenna portion 16 is obtained by patterning a mesh-patterned metal film 16A on the surface of the substrate 15. The mesh-patterned metal film 16A has many fine meshes (openings) 16A1 arranged in a regular plane pattern to allow light to pass through the meshes 16A1, and thus the antenna device 13 has a certain level of light transmittance. For example, the mesh-patterned metal film 16A is produced by forming a solid-patterned metal film on the substrate 15 and then forming the meshes 16A1 by, for example, etching the solid-patterned metal film. The mesh-patterned metal film 16A is formed of a metal material having high conductivity, such as copper. Slits 16A2 are made in the mesh-patterned metal film 16A to define the shape of each of the spiral antenna portions 16 and define the borders between the antenna portions 16 arranged on the substrate 15.

The arrangement of the antenna portions 16 on the substrate 15 is described in detail with reference to FIG. 2. As illustrated in FIG. 2, the antenna portions 16 arranged side by side in columns have a partial overlap between the antenna portions 16 next to each other. Specifically described, two of the antenna portions 16 that have one or more of the antenna portions 16 therebetween do not overlap each other, but adjacent two of the antenna portions 16 that have no antenna portion 16 therebetween partially overlap each other. In general explanation, among the antenna portions 16 arranged side by side in columns, the (n+1)th antenna portion 16 from the endmost column overlaps the nth antenna portion 16 and the (n+2)th antenna portion 16, but the nth antenna portion 16 and the (n+2)th antenna portion 16 do not overlap each other. The number "n" is a natural number. In other words, among the antenna portions 16 arranged side by side in columns, the antenna portions 16ON located at odd-numbered positions from the endmost column do not overlap each other, and the antenna portions 16EN located at even-numbered positions from the endmost column do not overlap each other. In the following description, when the antenna portions 16 need to be distinguished from each other, a suffix "ON" is added to the reference numeral of the antenna portions 16 located at the odd-numbered positions and a suffix "EN" is added to the reference numeral of the antenna portions 16 located at the even-numbered positions, and when the antenna portions 16 do not need to be distinguished from each other, the suffixes are not added to the reference numeral. Furthermore, two antenna portions 16 overlapping (adjacent to) each other include the antenna portion 16ON located at the odd-numbered position and the antenna portion 16EN located at the even-numbered position. Two antenna portions 16 (the nth antenna portion 16 and the (n+2)th antenna portion 16) that have one antenna portion 16 therebetween are spaced apart from each other, and the central position between them substantially matches the central position of the antenna portion 16 ((n+1)th antenna portion 16) adjacent to both the two antenna portions 16. In other words, the width of the overlapping portions of the antenna portions 16 located next to each other with an overlap therebetween is smaller than half the width of the antenna portions 16. The distance between the two antenna portions 16 having one antenna portion 16 therebetween is smaller than the width of the antenna portion in the device-side antenna. This configuration allows, when the odd-numbered antenna portions 16ON are activated, the device-side antenna to capture the magnetic field generated in one of the antenna portions 16ON regardless of the position of the device-side antenna relative to the antenna portions 16ON in the X axis direction. In the same way, this configuration allows, when the even-numbered antenna portions 16EN are activated, the device-side antenna to capture the magnetic field generated in one of the antenna portions 16EN regardless of the position of the device-side antenna relative to the antenna portions 16EN in the X axis direction. Furthermore, the antenna portions 16 at the endmost columns each overlap only one of the antenna portions 16, and the other antenna portions 16 at the middle each overlap two of the antenna portions 16.

As illustrated in FIG. 2, the antenna device 13 of the present embodiment includes multiple common lines 17 each connected to and shared by a set of the antenna portions 16 not overlapping each other to collectively activate the set of the antenna portions 16 as a connection target. The common lines 17 are disposed on the substrate 15. The common lines 17 may be formed of the mesh-patterned metal film 16A, which forms the antenna portions 16, or may be formed of a different metal film from the mesh-patterned metal film 16A. In either case, the substrate 15 included in the antenna device 13 is a "multi-component substrate" on which both the antenna portions 16 and the common lines 17 are disposed. The common lines 17 extend in the X axis direction on the surface of the substrate 15 and extends across the antenna portions 16 arranged side by side in columns. The common lines 17 include an odd-number common line 17A connected to and shared by, among the antenna portions 16 arranged side by side in columns, the antenna portions 16ON located at the odd-numbered positions from the endmost column, and an even-number common line 17B connected to and shared by the antenna portions 16EN located at the even-numbered positions from the endmost column. The odd-number common line 17A includes a first odd-number common line 17A1 connected to one end of each of the antenna portions 16ON and a second odd-number common line 17A2 connected to the other end of each of the antenna portions 16ON. When an alternating current is applied to the first and second odd-number common lines 17A1 and 17A2, the antenna portions 16ON located at the odd-numbered positions from the endmost column and not overlapping each other are collectively activated. In contrast, the even-number common line 17B includes a first even-number common line 17B1 connected to one end of each of the antenna portions 16EN and a second even-number common line 17B2 connected to the other end of each of the antenna portions 16EN. When an alternating current is applied to the first and second even-number common lines 17B1 and 17B2, the antenna portions 16EN located at the even-numbered positions from the endmost column and not overlapping each other are collectively activated. In this configuration, an electric current is alternately applied to the odd-number common line 17A and the even-number common line 17B to alternately activate about a half of the antenna portions 16 arranged side by side in columns and the other half of the antenna portions 16.

Furthermore, as illustrated in FIG. 2, a circuit board 18 including various circuits for applying current to the common lines 17, for example, is connected to the antenna device 13 having the above-described configuration. The circuit board 18 includes antenna control circuits 19 connected to the common lines 17, a switching circuit 20 connected to the antenna control circuits 19, and a Read/Write (R/W) circuit 21 connected to the switching circuit 20. The antenna control circuits 19 include one connected to the first and second odd-number common lines 17A1 and 17A2 of the odd-number common line 17A and one connected to the first and second even-number common lines 17B1 and 17B2 of the even-number common line 17B. The antenna control circuits 19 control the even-numbered antenna portions 16ON and the odd-numbered antenna portions 16EN, to which an electric current is applied respectively through the odd-number common lines 17A and the even-number common lines 17B, to have the same predetermined resonant frequency. In this embodiment, the antenna control circuits 19 include one for the odd-number common lines 17A and one for the even-number common lines 17B, i.e., two antenna control circuits 19. The switching circuit 20 switches the signal input target between the two antenna control circuits 19. The R/W circuit 21 sends a signal to the switching circuit 20 and also reads a signal relating to the current induced in the antenna portion 16 by the electric current applied to the device-side antenna. The circuit board 18 may be a flexible board directly connected to the substrate 15 of the antenna device 13 or may be a rigid substrate indirectly connected to the substrate 15 with a flexible board therebetween.

The configuration of the present embodiment is as described above. Next, the effect of the present embodiment is described. The user sees an image on the display surface 14A of the liquid crystal panel 14 included in the liquid crystal display device 10 from the front side and moves a device toward the display surface 14A from the front side based on the image. At this time, an electric current is applied to the common lines 17 to activate the antenna portions 16, and thus magnetic fields are generated in the magnetic generation areas of the antenna portions 16. When the device-side antenna of the device captures the magnetic field generated in the magnetic field generation area, the induced current flows through the device-side antenna and wireless communication is established.

Here, as illustrated in FIG. 2, in the antenna device 13 of the present embodiment, the antenna portions 16 are arranged side by side in columns with a partial overlap between the antenna portions 16 next to each other. This configuration allows the device-side antenna to reliably capture the magnetic field generated in one of the antenna portions 16 regardless of the position of the device in the X axis direction (arrangement direction) on the display surface 14A. Specifically described, if the antenna portion 16 and the device-side antenna are in a specific positional relationship, the antenna portion 16 would become unable to establish wireless communication with the device-side antenna and become unsensitive. Specifically described, when the center of the device-side antenna is positioned on any one of the layers of the antenna portions 16, the right and left concentric electric fields generated at the layer are symmetric about the device-side antenna. Thus, the electrical fields are cancelled out, and the induced current does not flow through the device-side antenna. To solve the problem, the antenna portions 16 arranged side by side in columns are positioned to have an overlap between the antenna portions 16 next to each other. With this configuration, even if the device-side antenna is positioned relative to one of the antenna portions 16 at an insensitive position, another antenna portion 16 that overlaps the one of the antenna portions 16 is not insensitive to the device-side antenna, and thus the induced current flows through the device-side antenna due to the magnetic field generated in the overlapping antenna portion 16. With this configuration, wireless communication is reliably established regardless of the position of the device relative to the display surface 14A.

Next, the activation of the antenna portions 16 by the electric current flowing through the common line 17 is described in detail with reference to FIGS. 5 and 6. In FIGS. 5 and 6, the activated antenna portions 16 are selectively shaded. An electric current is applied alternately to the odd-number common line 17A and the even-number common line 17B to activate the antenna portions 16. When an alternating current is applied to the first and second odd-number common lines 17A1 and 17A2 of the odd-number common lines 17A, among the antenna portions 16 arranged side by side in columns, the antenna portions 16ON located at the odd-numbered positions from the endmost column are collectively activated as illustrated in FIG. 5. The magnetic fields generated in the odd-numbered antenna portions 16ON do not interfere with each other, because the odd-numbered antenna portions 16ON do not overlap each other. Then, when an alternating current is applied to the first and second even-number common lines 17B1 and 17B2 of the even-number common line 17B, among the antenna portions 16 arranged side by side in columns, the antenna portions 16EN located at even-numbered positions from the endmost column are collectively activated as illustrated in FIG. 6. The magnetic fields generated in the even-numbered antenna portions 16EN do not interfere with each other, because the even-numbered antenna portions 16EN do not overlap each other. In this way, a set of the odd-numbered antenna portions 16ON and a set of the even-numbered antenna portions 16EN are alternately activated by the electric current alternately applied to the odd-number common line 17A and the even-number common line 17B. This allows the device-side antenna to capture the magnetic field generated in one of the alternately activated antenna portions 16ON and 16EN regardless of the position of the device relative to the display surface 14A in the X axis direction. Thus, communication is reliably established. Furthermore, all the antenna portions 16 are activated by applying an electric current to each of the odd-number common line 17A and the even-number common line 17B. Compared with a conventional configuration in which antenna portions arranged side by side in columns are connected to different lines and activated in sequence, this configuration, which includes the minimum common lines 17 and the minimum antenna control circuits 19, has a simple circuit configuration and requires a short activation time, because the time required to activate all the antenna portions 16 is minimized. Specifically described, in the conventional technology, the time taken to activate all the antenna portions equals to the value obtained by multiplying the activation time of each of the antenna portions (for example, 60 ms), which is activated by application of an electric current to each of the lines, by the number of antenna portions arranged side by side. In contrast, in this embodiment, the time taken to activate all the antenna portions 16 equals to the value (for example, 120 ms) obtained by multiplying the activation time of the antenna portions 16 (for example, 60 ms), which are activated by application of an electric current to each of the lines, by 2. The time taken to activate all the antenna portions 16 is drastically reduced. Furthermore, the reduction in number of the antenna control circuits 19 allows the switching circuit 20 to have a simpler configuration and a smaller size. In particular, an increase in the size of the display surface 14A of the liquid crystal panel 14 increases the number of antenna portions, and thus, in the conventional technology, the time taken to activate all the antenna portions increases. However, the time taken to activate all the antenna portions does not change (constant) in the present embodiment. Thus, the present embodiment is preferably applied to a large-size liquid crystal display panel 10.

As described above, the antenna device 13 of the present embodiment includes the antenna portions 16 arranged side by side in columns with a partial overlap between the antenna portions 16 next to each other, and the common lines 17 each connected to and shared by a set of the antenna portions 16 not overlapping each other to collectively activate the set of the antenna portions 16.

In this configuration, the antenna portion 16 generates a magnetic field due to electromagnetic induction caused by application of an electric current and establishes communication with the communication target by using the magnetic field. In this configuration, even when the position of the communication target in the arrangement direction of the antenna portions 16 is unstable, communication is reliably established, because the antenna portions 16 are arranged side by side in columns with a partial overlap between the antenna portions 16 next to each other. The common lines 17 are each connected and shared by, among the antenna portions 16 arranged side by side in columns, a set of the antenna portions 16 not overlapping each other to collectively activate the set of the antenna portions 16 by application of an electric current to the common line 17. Thus, the magnetic fields generated in the antenna portions 16 activated by application of an electric current to the common line 17 do not interfere with each other. The common line 17 includes multiple lines so as to be connected to the multiple sets of the antenna portions 16. Thus, all the antenna portions 16, which are arranged side by side in columns, are activated by applying an electric current to the common lines 17 in sequence. This configuration simplifies the circuit configuration and reduces the time taken to activate all the antenna portions 16 compared with a configuration in which different lines are connected to the respective antenna portions 16.

Furthermore, among the antenna portions 16 arranged side by side in columns, the (n+1)th antenna portion 16 from the endmost column overlaps the nth antenna portion 16 and the (n+2)th antenna portion 16, and the nth antenna portion 16 and the (n+2)th antenna portion 16 do not overlap each other. With this configuration, for example, when the communication target is positioned in the arrangement direction of the antenna portions 16, in which the antenna portions 16 are arranged, at an insensitive portion of the (n+1)th antenna portion 16, the communication target is able to establish communication with the nth antenna portion 16 or the (n+2)th antenna portion 16, which overlaps the (n+1)th antenna portion 16. The communication stability is high. Furthermore, the nth antenna portion 16 and the (n+2)th antenna portion 16 do not overlap each other, and thus when these antenna portions 16 are collectively activated, the magnetic fields generated in these antenna portions 16 do not interfere with each other. The number "n" is a natural number.

Furthermore, the common lines 17 include the odd-number common line 17A connected to and shared by the antenna portions 16ON located at the odd-numbered positions from the endmost column and the even-number common line 17B connected to and shared by the antenna portions 16EN located at the even-numbered positions from the endmost column. The antenna portions 16ON located at the odd-numbered positions from the endmost column do not overlap each other, and the antenna portions 16EN located at the even-numbered positions from the endmost column do not overlap each other. The sets of the non-overlapping antenna portions 16 are each collectively activated by alternately applying an electric current to the odd-number common line 17A, which is connected to and shared by the odd-numbered antenna portions 16ON, and to the even-number common line 17B, which is connected to and shared by the even-numbered antenna portions 16EN. With this configuration, the number of common lines 17 is minimized and the activation time is minimized. In particular, this configuration is advantageously applied to a large-size antenna device 13.

Furthermore, this embodiment includes the substrate (co-component substrate) 15 on which both the antenna portions 16 and the common lines 17 are disposed. This configuration advantageously reduces the number of components compared with a configuration in which the antenna portions 16 and the common lines 17 are disposed on different substrates.

Furthermore, the touch panel (position input device including an antenna device) 12 of the present embodiment includes the antenna device 13 and the touch electrodes (position detection electrodes) that form capacitance with a position input body to enable detection of the position input by the position input body. In the touch panel 12 having such a configuration, the position input by the position input body is detected by using the touch electrodes. Thus, when the communication target is moved relative to the antenna device 13 to establish communication, the position of input by the communication target is detectable.

Furthermore, the liquid crystal display device (display device including an antenna device) 10 of the present embodiment includes the above-described antenna device 13 and the liquid crystal panel (display panel) 14 disposed over the antenna device 13 and having the display surface 14A on which an image is displayed. The liquid crystal display device 10 having such a configuration uses an image on the liquid crystal panel 14 to guide a communication target toward the antenna device 13.

Second Embodiment

A second embodiment is described with reference to FIGS. 7 and 8. In the second embodiment, the configuration of an antenna device 113 is different. The same structures, effects, and advantages as those in the first embodiment are not repeatedly described.

Figure 7:
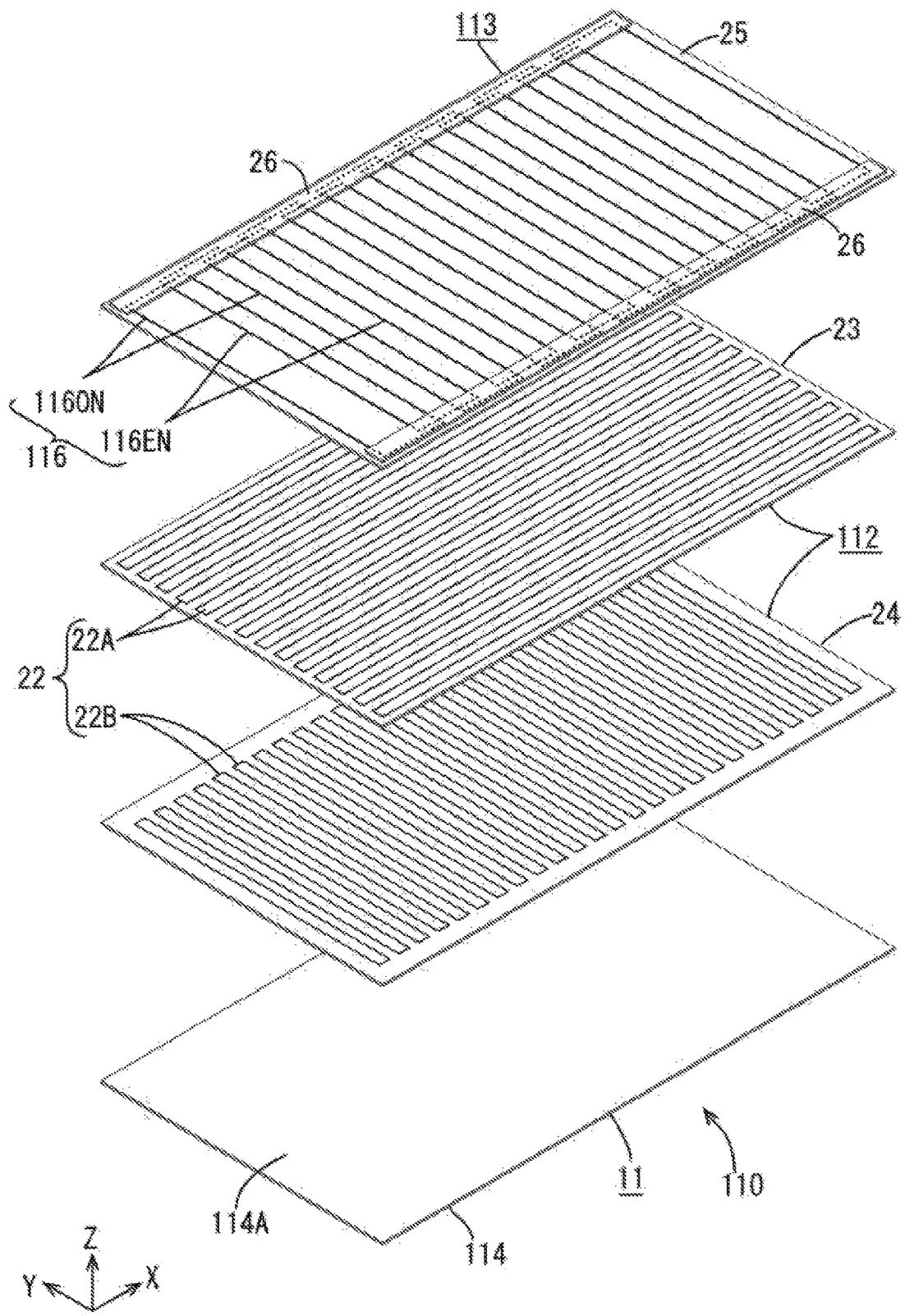
FIG. 7 is an exploded perspective view illustrating a liquid crystal display device according to a second embodiment.
Figure 8:
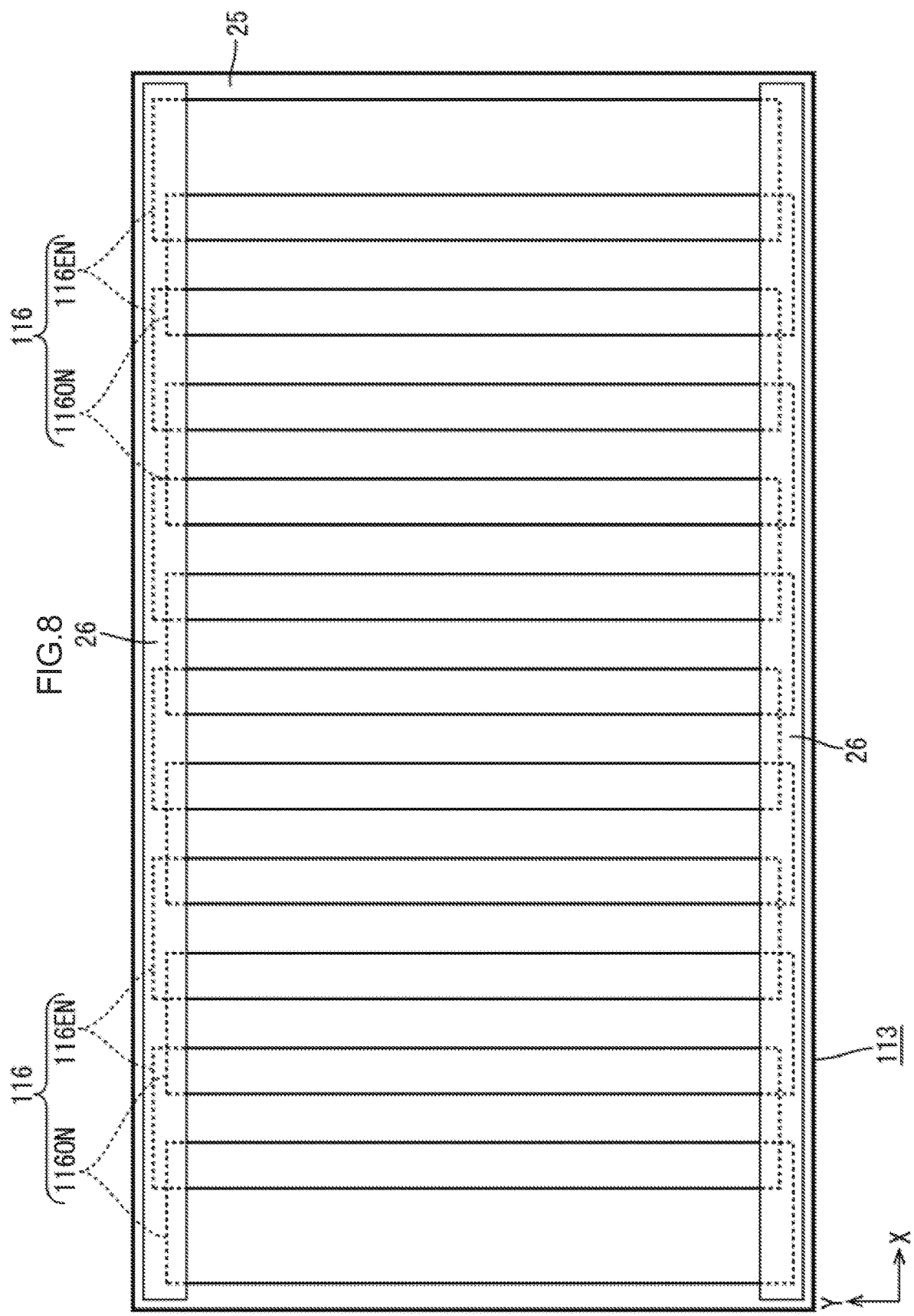
FIG. 8 is a plan view illustrating an antenna device.

First, as illustrated in FIG. 7, an example of a specific configuration of a touch panel 112 included in a liquid crystal display device 110 is described in this embodiment. The touch panel 112 includes touch electrodes 22 constituting a projected capacitive touch panel pattern using a self-capacitance detection method. The touch electrodes 22 include multiple detection electrodes (first position detection electrodes) 22A and multiple driving electrodes (second position detection electrodes) 22B overlapping the detection electrodes 22A. The touch panel 112 includes a first substrate 23 on which the detection electrodes 22A are disposed and a second substrate 24 on which the driving electrodes 22B are disposed. The first and second substrates 23 and 24 are each formed of a substantially transparent synthetic resin or glass material having high light-transmitting properties and have a horizontally long rectangular shape. In this embodiment, the first substrate 23 is layered on top of the second substrate 24.

As illustrated in FIG. 7, the detection electrodes 22A on one of the surfaces of the first substrate 23 extend in the X axis direction or the arrangement direction of the antenna portions 116 and have a horizontally long rectangular shape in a plan view. The detection electrodes 22A are arranged side by side in the Y axis direction or a direction perpendicular to the arrangement direction of the antenna portions 116 with a space therebetween. The driving electrodes 22B on one of the surfaces of the second substrate 24 extend in the Y axis direction or a direction perpendicular to an extending direction of the detection electrodes 22A in which the detection electrodes 22A extend and have a vertically long rectangular shape in a plan view. The driving electrodes 22B are arranged side by side in the X axis direction or the extending direction of the detection electrodes 22A with a space therebetween. The detection electrodes 22A and the driving electrodes 22B overlap each other in plan view. When the driving electrode 22B receives a signal, an electrical field is generated between the driving electrode 22B and the detection electrode 22A overlapping the driving electrode 22B. At a position of the display surface 114A of the liquid crystal panel 114 where the user's finger as an input body approached, the electric field generated between the detection electrode 22A and the driving electrode 22B is locally reduced. The position input by the finger is detected by measuring the reduction of the electric field. The detection electrodes 22A and the driving electrodes 22B may be formed of a mesh-patterned metal film as the antenna portions 116 or may be formed of a transparent electrode film, such as ITO.

Next, the antenna device 113 of this embodiment is described. As illustrated in FIGS. 7 and 8, the antenna device 113 includes an antenna substrate 25 on which the multiple antenna portions 116 are disposed and wiring substrates 26 attached to the antenna substrate 25 and on which multiple common lines are disposed. The antenna substrate 25 has the same configuration as the antenna substrate 15 in the first embodiment and has the antenna portions 116 on one of the surfaces. The wiring substrates 26 are each flexible and formed of a synthetic resin material and have the common lines on one of the surfaces. The wiring substrates 26 extend in the X axis direction or an extending direction of the common lines in which the common lines extend and is horizontally long. The length of the wiring substrate 26 is substantially the same as the long-side dimension of the antenna substrate 25. Two wiring substrates 26 are disposed on the end portions of the antenna substrate 25 located at the ends in the Y axis direction. One of the wiring substrates 26 has the odd-number common line and the other of the wiring substrates 26 has the even-number common line. The wiring substrates 26 are located outside the display area of the liquid crystal panel 114 (in the non-display area), and thus light transmitting properties required for the antenna portions 116 are not required for the wiring substrates 26. In this configuration, the odd-number common line and the even-number common line of the common lines are spaced apart from each other in a direction perpendicular to the arrangement direction of the antenna portions 116 with the antenna portions 116 arranged side by side in columns therebetween and are selectively connected to the odd-numbered antenna portions 116ON and the even-numbered antenna portions 116EN. Although the common lines overlap all the antenna portions 116 arranged side by side in columns, the common lines are disposed on the dedicated wiring substrates 26, and thus the common lines do not short-circuit to the antenna portions 116 that are not connection targets. In this configuration, the frame width of the antenna substrate 25 at the ends in the Y axis direction is smaller than that the substrate 15 in the first embodiment, allowing the antenna device 113 to have a smaller frame width.

As described above, the antenna device of this embodiment includes the antenna substrate 25 on which the antenna portions 116 are disposed and the wiring substrates 26 attached to the antenna substrate 25 and on which the common lines are disposed. This configuration does not require the antenna substrate 25 having the antenna portions 116 to have a space for multiple common lines, because the common lines are disposed on the wiring substrates 26. This configuration is advantageously employed to reduce the frame width of the antenna substrate 25.

Furthermore, the two wiring substrates 26 are spaced apart from each other in the direction perpendicular to the arrangement direction of the antenna portions 116 with the antenna portions 116 therebetween and the common lines are separately disposed on the two wiring substrates 26. This configuration reduces the size of each of the wiring substrates 26 compared with a configuration in which a wiring substrate 26 is disposed only at one end in the direction perpendicular to the arrangement direction of the antenna portions 116, because the common lines are separately disposed on the two wiring substrates 26. This configuration is advantageously employed to further reduce the frame width of the antenna substrate 25.

Third Embodiment

A third embodiment is described with reference to FIGS. 9 to 11. In the third embodiment, a touch panel 212 and an antenna device 213 have different configurations from those in the second embodiment. The same structures, effects, and advantages as those in the second embodiment are not repeatedly described.

Figure 9:
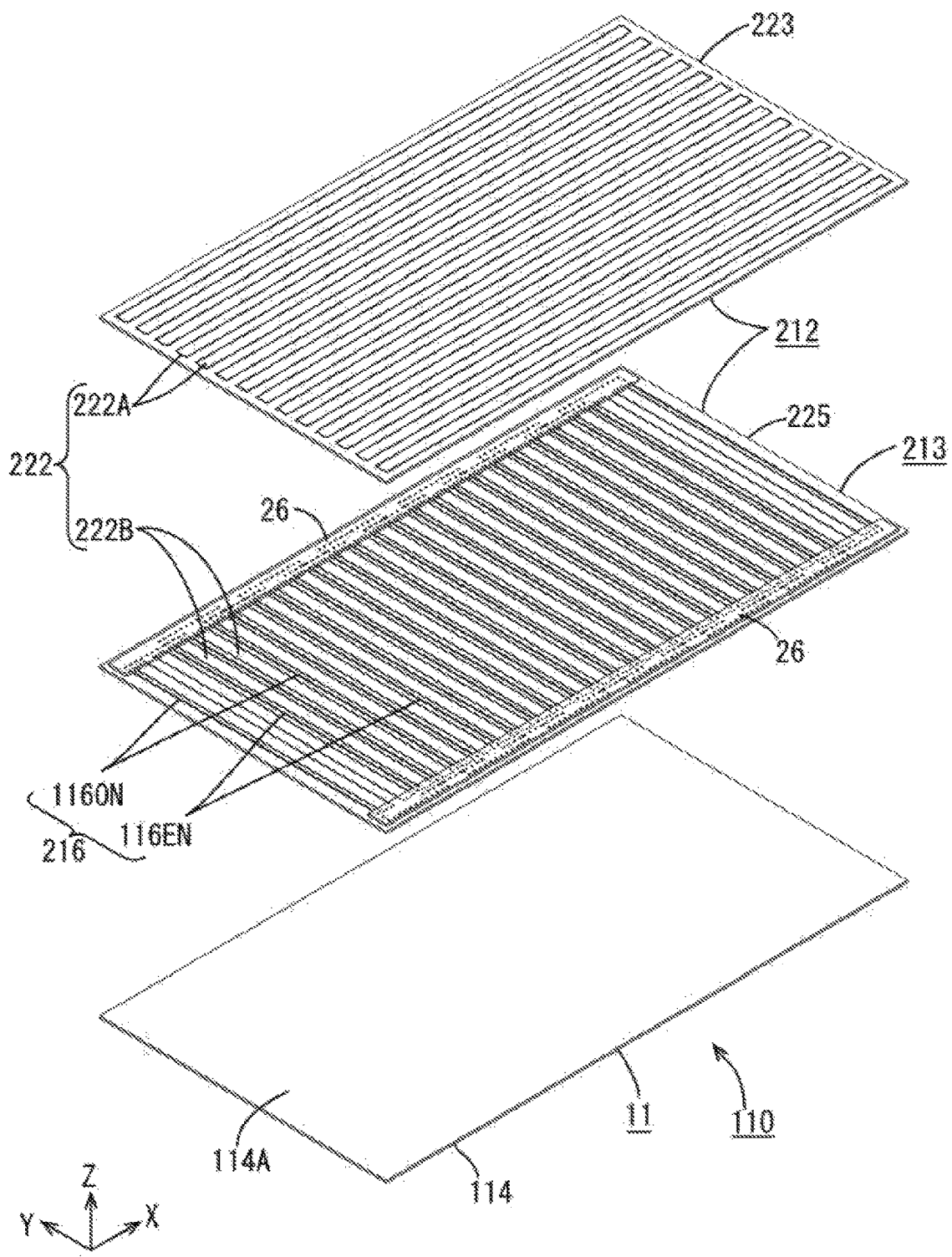
FIG. 9 is an exploded perspective view illustrating a liquid crystal display device according to a third embodiment.

As illustrated in FIG. 9, driving electrodes 222B of the touch panel 212 in this embodiment are included in the antenna device 213. Specifically described, the touch panel 212 includes a first substrate (electrode mounting substrate) 223, multiple detection electrodes 222A on the first substrate 223, and multiple driving electrodes 222B on the antenna substrate 225 of the antenna device 213. The touch panel 212 does not include the second substrate 24 (FIG. 7) described in the second embodiment. This configuration, which does not include the second substrate 24, requires the small number of components compared with the configuration of the second embodiment in which the detection electrodes 22A and the driving electrodes 22B are respectively disposed on the first substrate 23 and the second substrate 24, and is advantageously employed to reduce the thickness. The antenna device 213 is disposed on the rear side of the first substrate 223 of the touch panel 212.

Figure 10:
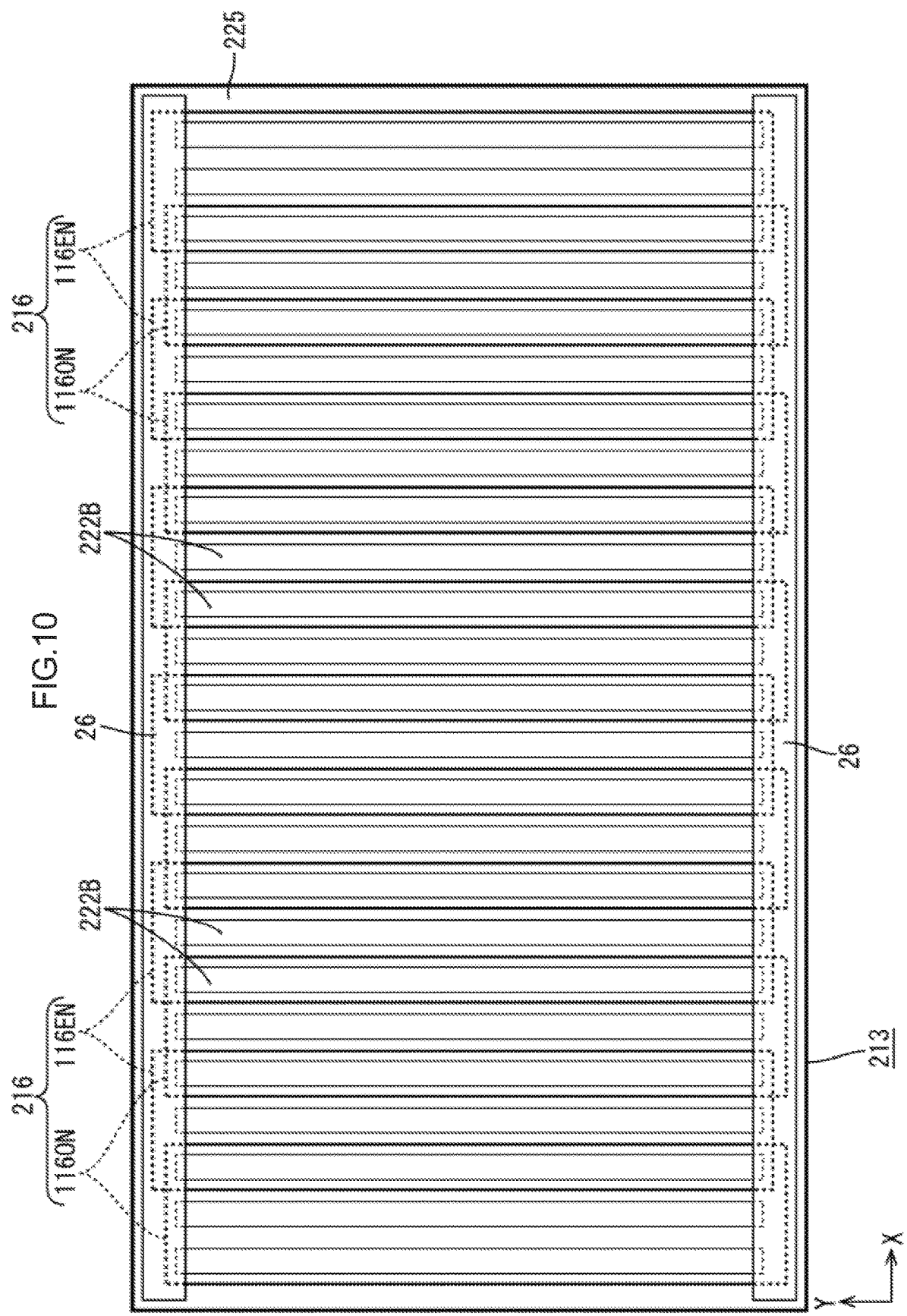
FIG. 10 is a plan view illustrating an antenna device.
Figure 11:
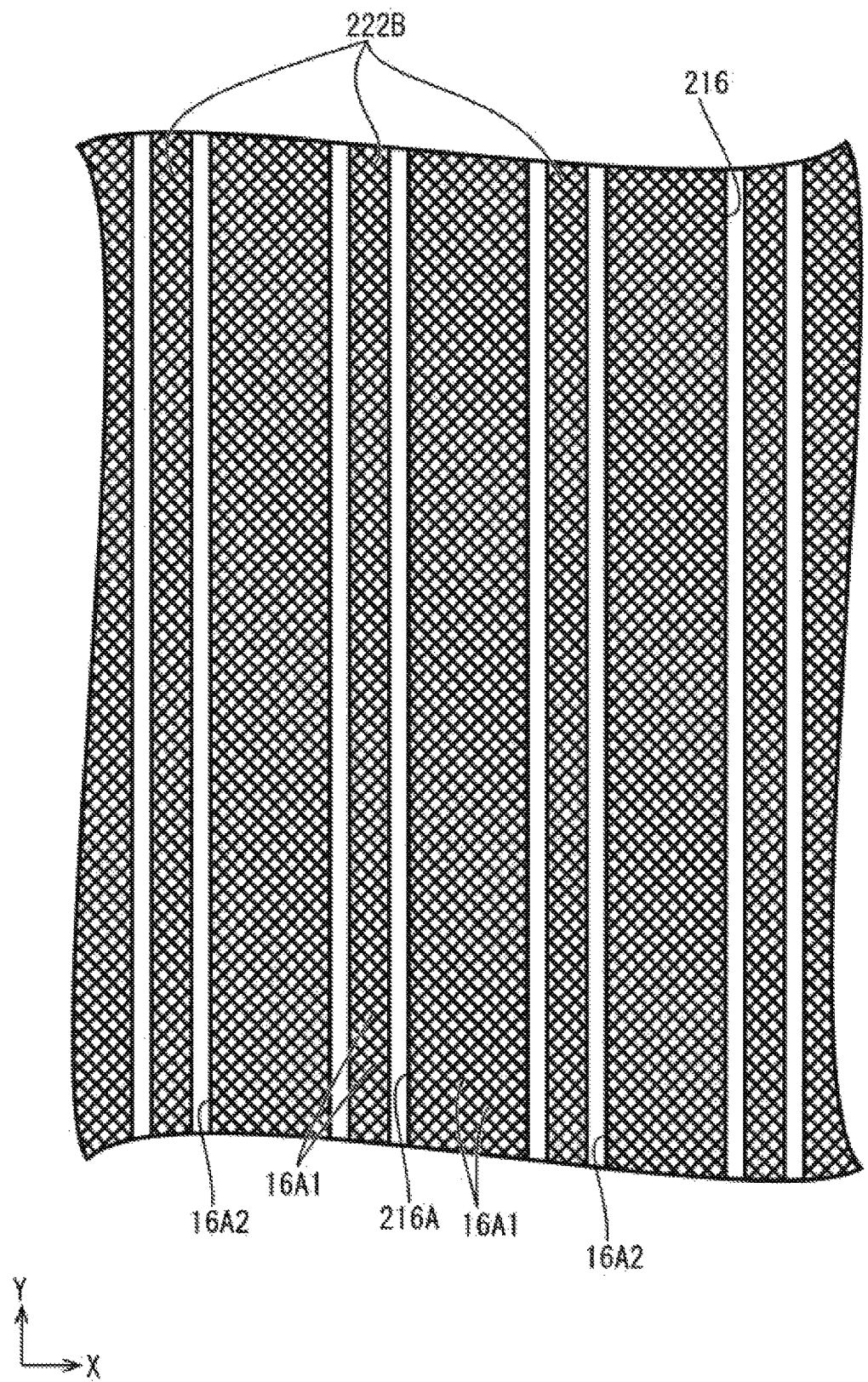
FIG. 11 is a magnified plan view illustrating an antenna portion and touch electrodes.

As illustrated in FIG. 10, the driving electrodes 222B are disposed in the formation area of the antenna portions 216 on the surface of the antenna substrate 225. The antenna portions 216 each extend in a vertically long spiral pattern as described in the first embodiment and have a space between the parallel layers. Thus, the driving electrodes 222B are disposed in the spaces between the layers of the antenna portions 216. The driving electrodes 222B extend in the Y axis direction and are positioned in the spaces between the long sides of the layers of the antenna portions 216. As illustrated in FIG. 11, the driving electrodes 222B are formed of a mesh-patterned metal film 216A that forms the antenna portions 216. In other words, the antenna portions 216 and the driving electrodes 222B are all formed of the mesh-patterned metal film 216A on the antenna substrate 225, and the shapes thereof in a plan view are determined by the slits patterned in the mesh-patterned metal film 216A. In this configuration, the antenna portions 216 do not overlap the driving electrodes 222B. This configuration has a higher light transmittance than a configuration in which antenna portions formed of a mesh-patterned metal film on one of the surfaces of the antenna substrate 225 overlaps driving electrodes formed of a mesh-patterned metal film on the other of the surfaces of the antenna substrate 225. Furthermore, this configuration is readily produced by forming the mesh-patterned metal film 216A on only one of the surfaces of the antenna substrate 225 and patterning the metal film 216A.

As described above, in the touch panel 212 of this embodiment, the touch electrodes 222 include the multiple detection electrodes (first position detection electrodes) 222A and the multiple driving electrodes (second position detection electrodes) 222B. The detection electrodes 222A extend in the arrangement direction of the antenna portions 216 arranged in columns and are arranged side by side in a direction perpendicular to the arrangement direction. The driving electrodes (second position detection electrodes) 222B extend in the direction perpendicular to the arrangement direction and are arranged side by side in the arrangement direction. The driving electrodes 222B are located over the detection electrodes 222A to form capacitance with the corresponding detection electrodes 222A. The touch panel 212 includes the first substrate (electrode mounting substrate) 223 disposed over the antenna device 213 and on which the detection electrodes 222A or the driving electrodes 222B are disposed, and the other of the detection electrodes 222A and the driving electrodes 222B are disposed on the antenna device 213. This configuration enables the position input by the position input body to be detected by using the detection electrodes 222A and the driving electrodes 222B overlapping each other. This configuration is advantageously employed to reduce the number of components and the thickness, compared with a configuration in which the detection electrodes 222A and the driving electrodes 222B are separately disposed on two substrates different from the antenna device 213, because the detection electrodes 222A or the driving electrodes 222B are disposed on the first substrate 223 overlapping the antenna device 213 and the other of the detection electrodes 222A and the driving electrodes 222B are disposed on the antenna device 213.

Furthermore, the detection electrodes 222A are disposed on the first substrate 223 and the driving electrodes 222B are disposed on the antenna device 213. The antenna device 213 includes the antenna substrate (substrate) 225 and the mesh-patterned metal film 216A on one of the surfaces of the antenna substrate 225. The antenna portions 216 and the driving electrodes 222B are formed of the metal film 216A and the shapes in a plan view of the antenna portions 216 and the driving electrodes 222B are defined by slits patterned in the metal film 216A. In this configuration, the antenna portions 216 do not overlap the driving electrodes 222B, because the antenna portions 216 and the driving electrodes 222B of the antenna device 213 are formed of the same mesh-patterned metal film 216A on one of the surfaces of the antenna substrate 225. Thus, this configuration has higher light transmittance than a configuration in which antenna portions formed of a mesh-patterned metal film on one of the surfaces of the antenna substrate overlap the driving electrodes formed of a mesh-patterned metal film on the other of the surfaces of the antenna substrate. Furthermore, this configuration is readily produced by forming the metal film 216A on only one of the surfaces of the antenna substrate 225 and patterning the metal film 216A.

Fourth Embodiment

A fourth embodiment is described with reference to FIGS. 12 to 13. In the fourth embodiment, the position of the antenna device 313 is different from that in the second embodiment. The same structures, effects, and advantages as those in the second embodiment are not repeatedly described.

Figure 12:
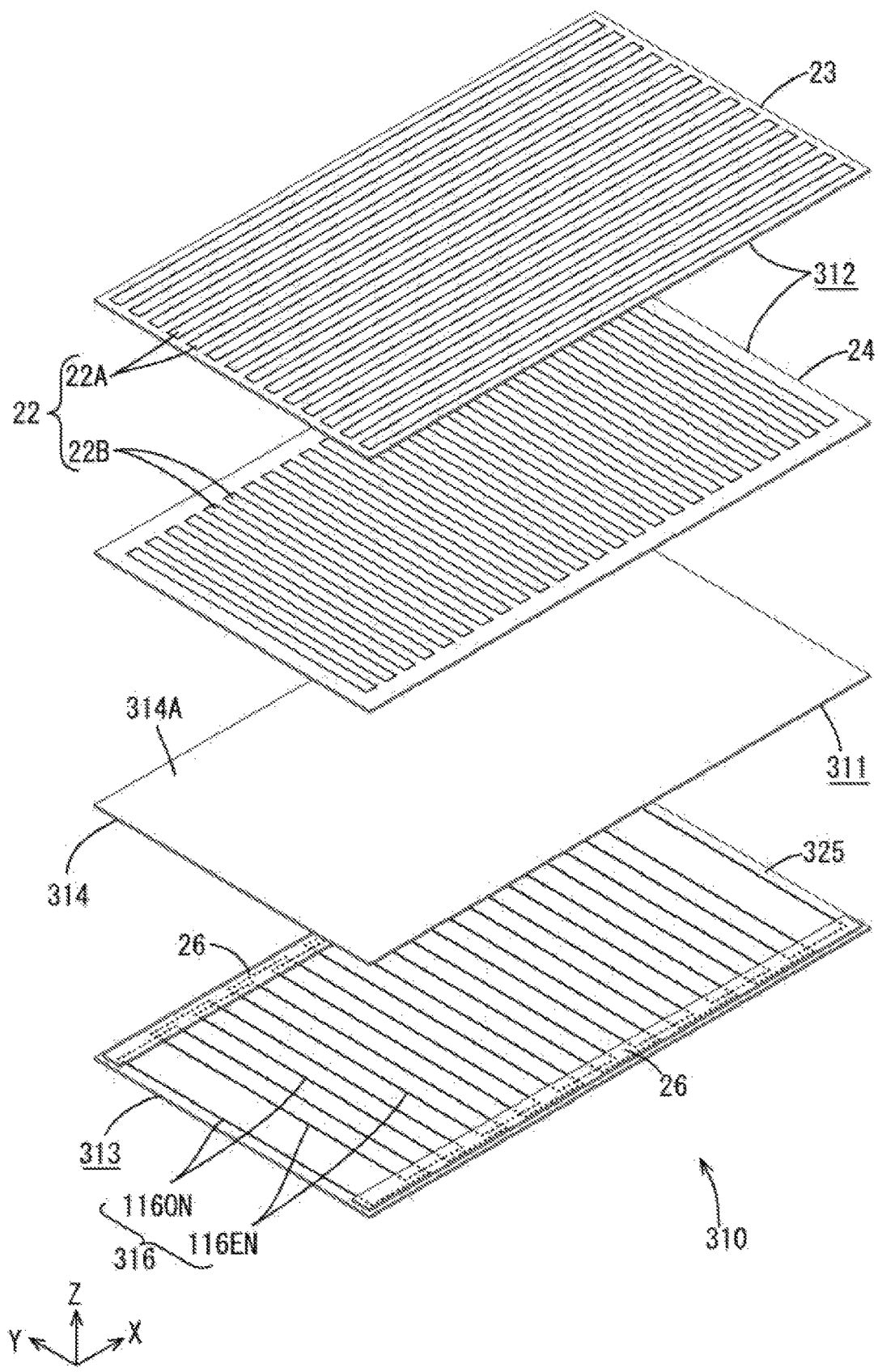
FIG. 12 is an exploded perspective view illustrating a liquid crystal display device according to a fourth embodiment.
Figure 13:
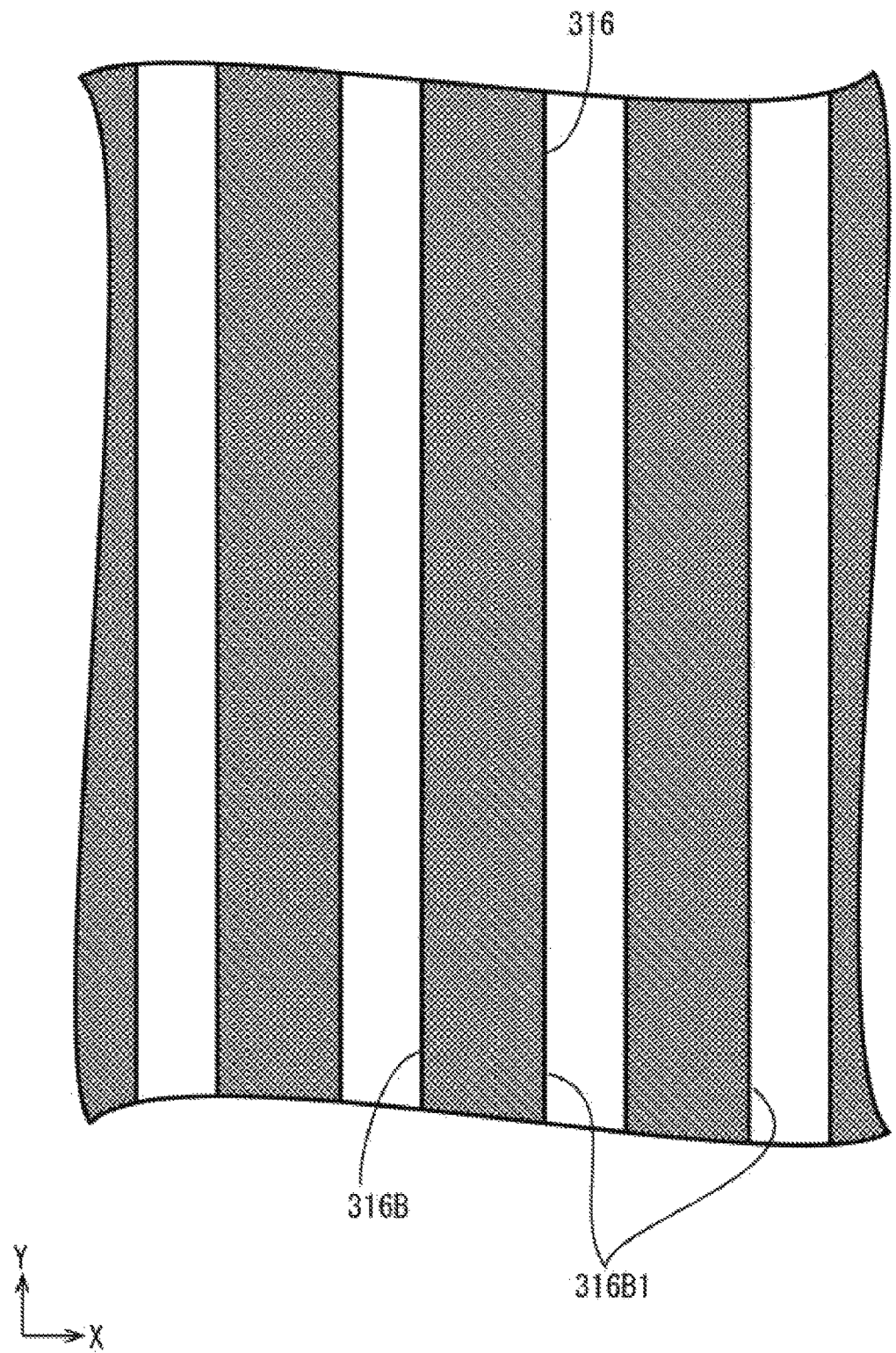
FIG. 13 is a magnified plan view illustrating an antenna portion.

As illustrated in FIG. 12, the antenna device 313 of this embodiment is disposed on the rear side of the liquid crystal display module 311 including the liquid crystal panel 314, i.e., on the side opposite from the display surface 314A. In other words, in this embodiment, the liquid crystal display device 310 includes, in this order from the rear side, the antenna device 313, the liquid crystal display module 311, and the touch panel 312. In this configuration, the antenna portions 316 of the antenna device 313 do not interfere with the user's view of an image on the display surface 314A of the liquid crystal panel 314. This configuration improves the brightness. In addition, this configuration eliminates the need for consideration of the light transmitting properties of the antenna device 313, which are taken into consideration in the first embodiment, and thus the antenna device 313 has more freedom of choice, for example, in materials of the components. Specifically described, this configuration enables a non-transparent material to be employed as a material of the antenna substrate 325. Thus, a general-purpose printed circuit board may be used as the antenna substrate, advantageously reducing the production cost. Furthermore, as illustrated in FIG. 13, the antenna portions 316 are formed of a solid-patterned metal film 316B on the surface of the antenna substrate 325. The wire resistance of the antenna portion 316 in this configuration is low compared with that in a configuration in which the antenna portions 16 are formed of the mesh-patterned metal film 16A as in the first embodiment, and thus this configuration has higher communication sensitivity. In FIG. 13, the solid-patterned metal film 316B is shaded.

As described above, in the liquid crystal display device 310 of this embodiment, the antenna device 313 is disposed on the surface of the liquid crystal panel 314 opposite the display surface 314A. With this configuration, the antenna portions 316 included in the antenna device 313 do not interfere with the user's view of an image on the display surface 314A of the liquid crystal panel 314. This configuration has higher brightness. Furthermore, there is no need for consideration of light transmitting properties of the antenna device 313, improving freedom of choice, for example, in materials of the components of the antenna device 313.

Furthermore, the antenna portions 316 are formed of the solid-patterned metal film 316B and the shapes in a plan view of the antenna portions 316 are defined by the slits 316B1 patterned in the metal film 316B. The wiring resistance in this configuration is low compared with that in a configuration in which the antenna portions 316 are formed of a mesh-patterned metal film, and thus this configuration has higher communication sensitivity.

Other Embodiments

The present technology is not limited to the embodiments described above and illustrated by the drawings. For example, the following embodiments are included in the technical scope.

Figure 14:
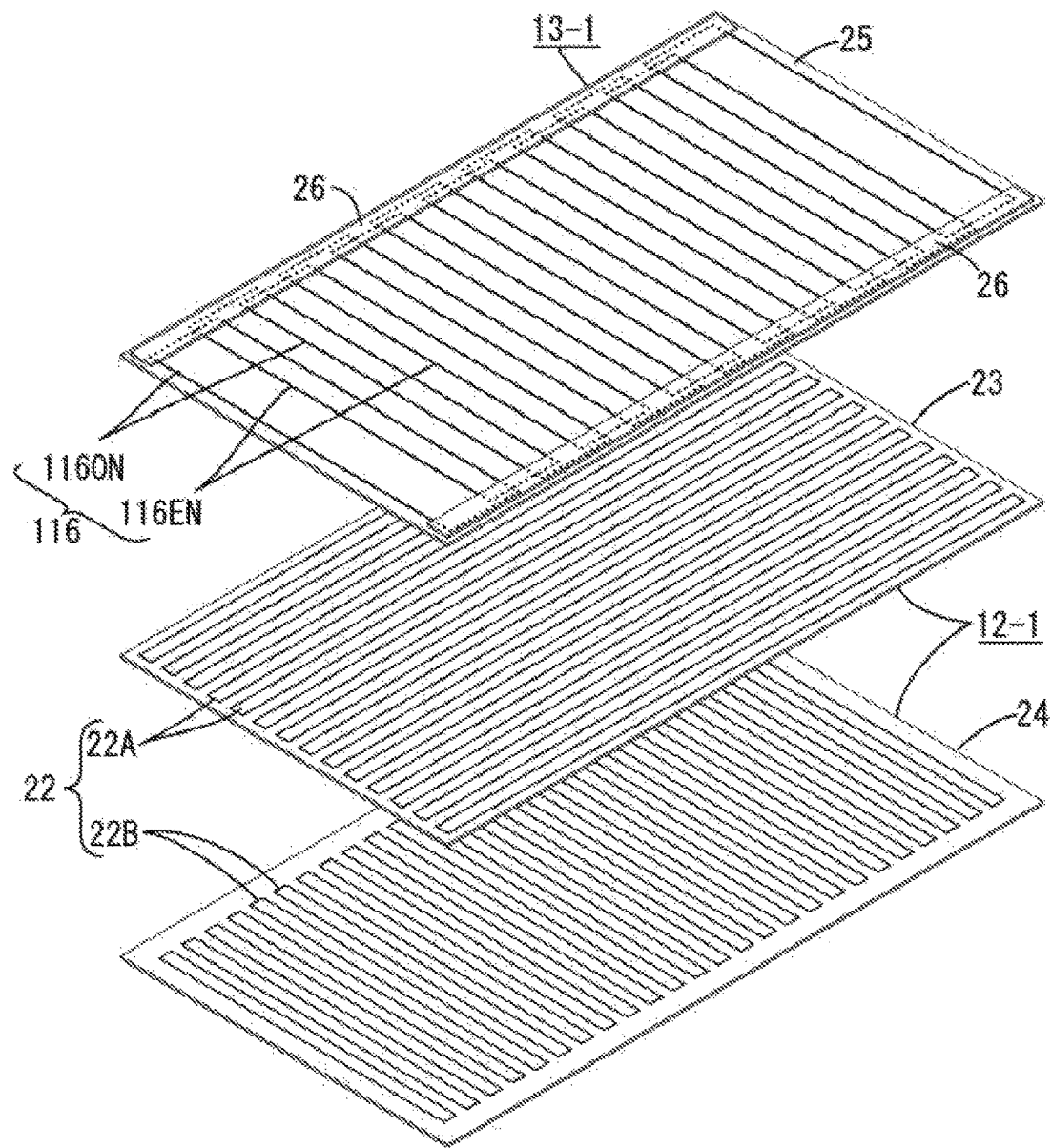
FIG. 14 is an exploded perspective view illustrating a touch panel including an antenna device according to another embodiment (1).

(1) In the above-described embodiments, the liquid crystal display device including a touch position detection function and a communication function is described. However, as illustrated in FIG. 14, the liquid crystal display module may be eliminated. The present technology is applicable to a touch panel (position input device including an antenna device) 12-1 provided with an antenna device 13-1.

(2) Instead of the above (1), the touch panel may be eliminated. The present technology is applicable to a liquid crystal display device including an antenna device and a liquid crystal display module.

(3) In the above-described embodiments, the common lines include two types of common lines, i.e., the odd-number common line and the even-number common line. However, the common lines may include three or more types of common lines. Specifically described, the common lines may include a first common line connected to, among six or more antenna portions arranged side by side in columns, the (3n+1)th antenna portions from the endmost column, a second common line connected to the (3n+2)th antenna portions from the endmost column, and a third common line connected to the (3n+3)th antenna portions from the endmost column. Herein, "n" is 0 or a natural number (positive integer).

(4) The specific number of antenna portions arranged in columns may be changed from that in the drawings of the above-described embodiments.

(5) In the above-described embodiments, the antenna portions are formed of a mesh-patterned meatal film. However, the antenna portions may be formed of a transparent electrode film.

(6) In the above-described second to fourth embodiments, the number of wiring substrates included in the antenna device is two. However, the number of wiring substrates may be one. In such a case, all the common lines are disposed on the one wiring substrate.

(7) In the third embodiment, the antenna portions and the driving electrodes are formed of the mesh-patterned metal film on one of the surfaces of the antenna substrate. However, the driving electrodes may be disposed on one of the surfaces of the antenna substrate and the antenna portions may be disposed on the other of the surfaces of the substrate. Alternatively, the detection electrodes may be disposed on one of the surfaces of the antenna substrate, the antenna portions may be disposed on the other of the surfaces of the antenna substrate, and the driving electrodes may be disposed on the second substrate of the touch panel.

(8) In the above-described second and third embodiments, the touch panel includes the first substrate on which the detection electrodes are disposed and the second substrate on which the driving electrodes are disposed. However, the touch panel may include one substrate on which both the detection electrodes and the driving electrodes are disposed. In such a case, the detection electrodes may be disposed on one of the surfaces of the substrate and the driving electrodes may be disposed on the other of the surfaces of the substrate. Alternatively, one of the detection electrode and the driving electrode may be disposed on one of the surfaces of the substrate, an insulating film may be disposed above the substrate, and the other of the detection electrode and the driving electrode is disposed above the insulating film.

(9) In the above-descried second to fourth embodiments, the touch panel includes a mutual capacitive touch panel pattern. However, the touch panel may include a self-capacitive touch panel pattern.

(10) In the above-described embodiments, the touch panel is an out-cell touch panel and is disposed outside the liquid crystal display panel. However, the touch panel may be an in-cell touch panel in which the touch electrodes (touch panel pattern) of the touch panel are disposed in the liquid crystal panel.

(11) In the above-described embodiments, a transmission-type liquid crystal display device including a backlight device as an external light source is described as the liquid crystal display device. However, the liquid crystal display device may be a reflection-type liquid crystal display device that provides display using outside light. In such a case, the backlight device may be eliminated. Alternatively, the liquid crystal display device may be a semi-transmissive liquid crystal display device.

(12) In the above-described embodiments, the liquid crystal display device including the liquid crystal panel is described as a display panel. However, an organic EL display device including an organic EL panel may be used as a display panel. Other types of display panels than the above may be employed.

The invention claimed is:

1. An antenna device comprising:
antenna portions arranged side by side in columns with a partial overlap between the antenna portions next to each other; and
common lines each connected to and shared by a set of the antenna portions not overlapping each other to collectively activate the set of the antenna portions, wherein
among the antenna portions arranged side by side in columns, a (n+1)th antenna portion from an endmost column overlaps a nth antenna portion and a (n+2)th antenna portion, and the nth antenna portion and the (n+2)th antenna portion do not overlap each other.

2. The antenna device according to claim 1, wherein the common lines include an odd-number common line connected to and shared by the antenna portions that are located at odd-numbered positions from the endmost column and an even-number common line connected to and shared by the antenna portions that are located at even-numbered positions from the endmost column.

3. The antenna device according to claim 1, further comprising a multi-component substrate on which both the antenna portions and the common lines are disposed.

4. The antenna device according to claim 1, further comprising:
an antenna substrate on which the antenna portions are disposed; and
a wiring substrate attached to the antenna substrate and on which the common lines are disposed.

5. An antenna device comprising:
antenna portions arranged side by side in columns with a partial overlap between the antenna portions next to each other;
common lines each connected to and shared by a set of the antenna portions not overlapping each other to collectively activate the set of the antenna portions;
an antenna substrate on which the antenna portions are disposed; and
a wiring substrate attached to the antenna substrate and on which the common lines are disposed, wherein
the wiring substrate includes two wiring substrates spaced apart from each other in a direction perpendicular to an arrangement direction of the antenna portions with the antenna portions therebetween, and the common lines are separately disposed on the two wiring substrates.

6. A position input device including an antenna device comprising:
the antenna device according to claim 1; and
a position detection electrode configured to form capacitance with a position input body to enable detection of a position input by the position input body.

7. A position input device including an antenna device comprising:
the antenna device comprising:
antenna portions arranged side by side in columns with a partial overlap between the antenna portions next to each other; and
common lines each connected to and shared by a set of the antenna portions not overlapping each other to collectively activate the set of the antenna portions; and
a position detection electrode configured to form capacitance with a position input body to enable detection of a position input by the position input body, wherein
the position detection electrode includes a plurality of first position detection electrodes and a plurality of second position detection electrodes, the plurality of first position detection electrodes extending in an arrangement direction of the antenna portions arranged in columns and being arranged side by side in a direction perpendicular to the arrangement direction, the plurality of second position detection electrodes extending in the direction perpendicular to the arrangement direction and being arranged side by side in the arrangement direction, the plurality of second position detection electrodes being located over the plurality of first position detection electrodes to form capacitance with the corresponding first position detection electrodes,
the position input device further comprises an electrode mounting substrate disposed over the antenna device and on which the plurality of first position detection electrodes or the plurality of second position detection electrodes is disposed, and
another one of the plurality of first position detection electrodes and the plurality of second position detection electrodes is disposed on the antenna device.

8. The position input device including an antenna device according to claim 7, wherein
the plurality of first position detection electrodes is disposed on the electrode mounting substrate and the plurality of second position detection electrodes is disposed on the antenna device,
the antenna device includes a substrate and a mesh-patterned metal film on one of surfaces of the substrate, and
the antenna portions and the plurality of second position detection electrodes are formed of the metal film and shapes of the antenna portions and the plurality of second position detection electrodes in a plan view are defined by slits patterned in the metal film.

9. A display device including an antenna device comprising:
the antenna device according to claim 1; and
a display panel disposed over the antenna device and having a display surface on which an image is displayed.

10. The display device including an antenna device according to claim 9, wherein the antenna device is disposed over a surface of the display panel opposite from the display surface.

11. The display device including an antenna device according to claim 10, wherein the antenna portions are formed of a solid-patterned metal film and shapes of the antenna portions in a plan view are defined by slits patterned in the metal film.

* * * * *